United States Patent [19]

Quenot

[11] E Re. 30,733

[45] Reissued Sep. 8, 1981

[54] BLADE-HOLDING CUTTING DEVICE

[75] Inventor: Michel Quenot, Ornans, France

[73] Assignee: Stanley-Mabo S.A., Besancon, France

[21] Appl. No.: 127,480

[22] Filed: Mar. 5, 1980

Related U.S. Patent Documents

Reissue of:

[64] Patent No.: 4,103,421
Issued: Aug. 1, 1978
Appl. No.: 792,194
Filed: Apr. 29, 1977

[51] Int. Cl.[3] ..... B26B 3/06

[52] U.S. Cl. ..... 30/162; 30/320; 30/335

[58] Field of Search ..... 30/162, 320, 335

[56] References Cited

U.S. PATENT DOCUMENTS

| | | | |
|---|---|---|---|
| 2,253,422 | 8/1941 | Douglass | 30/162 |
| 3,316,635 | 5/1967 | Merrow et al. | 30/162 |
| 3,448,518 | 6/1969 | Sklar | 30/162 |
| 3,453,729 | 7/1969 | Larson | 30/162 |
| 3,726,010 | 4/1973 | Yokoyama | 30/335 |
| 3,765,089 | 10/1973 | Ibata | 30/162 |

*Primary Examiner*—James L. Jones, Jr.
*Assistant Examiner*—J. T. Zatarga
*Attorney, Agent, or Firm*—Prutzman, Kalb, Chilton & Alix

[57] ABSTRACT

A cutting blade holding handle for a segmented removable blade.

A cutting blade holding handle having a rectilinear hollow body with curved outer faces and having an inner guide consisting of two identical grooves facing each other to slidably mount a removable blade and a lower parallel auxiliary groove which mounts a unitary slider connected to the blade and having a finger piece provided with two oppositely inclined faces for manipulating the blade, said body also having between the blade and its rear face a blade wedging mechanism having external control and latching means.

8 Claims, 9 Drawing Figures

BLADE-HOLDING CUTTING DEVICE

Matter enclosed in heavy brackets [ ] appears in the original patent but forms no part of this reissue specification; matter printed in italics indicates the additions made by reissue.

The present invention relates to a blade holding handle for a segmented, removable blade and is designed for general use in the most varied fields: offices, workshops, factory floors, household and professional uses.

In the past, cutting devices of this type have included blade holding handles with a removable blade which is slidably mounted in a hollow body of the handle and wherein the blade feed mechanism consists of a slider having at one of its ends a threaded part intended for a locking screw, the end of which passes through the blade and bears on the rear of the hollow body so as to lock the slider and thus, the blade in a given position.

Such mechanisms are designed to advance and lock the blade. This advance or feed movement is continued as far as the locking position selected by the user. These devices tend to be rather inefficient owing to a lack of precision resulting largely from the pressure applied at only one point.

Furthermore, vibrations or blows can loosen the screw and free the blade.

Other prior art blade-holding devices are safer because they are provided with a notch-type positioning device, a slider having a catch which is displaced along a rack bar. However, even a slider having a composite structure does not offer the requisite degree of operating safety and furthermore, the end of the device has projecting corners which constitute a real danger during use or even when simply being carried in a pocket.

The body of such devices must be specially manufactured, particularly in the case of bodies consisting of a plurality of elements which often gives rise to farily considerable assembly complications.

The cutting device according to the invention is designed to obviate these disadvantages while offering the use increased safety of operation and use and enabling the user to obtain a good grip on the device. It is also simple to manufacture.

The subject of the invention is characterized in that the body of the blade holding handle is provided with an inner guide consisting of two opposite grooves in which the blade slides and a parallel lower auxiliary groove mounting a unitary slider comprising a finger piece exposed through the front face of the handle and having two oppositely inclined manipulation faces connected to the blade for manipulating the same. An externally controllable, lockable blade wedging mechanism is disposed between the cutting blade and its rear face of the handle.

The main features and advantages of the invention are summarized hereinafter:

Safety of use and operation: absence of projections, good blade protection, blade locking feature;

Precision of use and easy handling: it handles in the manner of a writing instrument;

Blade positioning by means of notches;

Blade controlled by a single finger;

The blade can be locked in position using the same finger by turning over the device;

The edge of the blade does not become blunt because it slides in a plastic groove;

The device can be readily manufactured by molding and does not require finishing;

The device can be carried in the pocket without any danger;

The device can be readily attached by means of a pen clip attachment;

The slider is provided with two inclined manipulation faces, thereby ensuring precision feed and effective thrust;

The slider comprises a unitary structure which considerably simplifies assembly.

Other technical features of the invention will be made apparent in the course of the following description provided by way of example only with reference to the accompanying drawings, in which.

Figure 4:
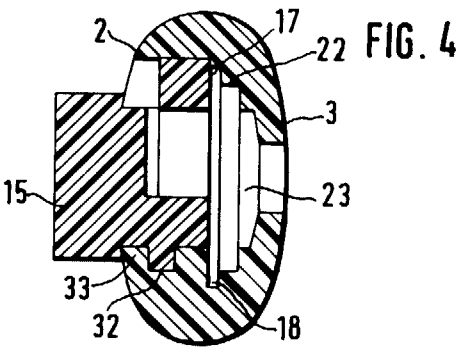
FIG. 4 is a transversal sectional view in the region of the slider.
Figure 5:
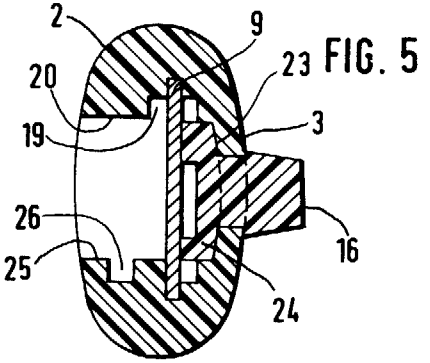
FIG. 5 is a transversal sectional view in the region of the wedging mechanism designed to lock the blade in adjuster position.
Figure 1:
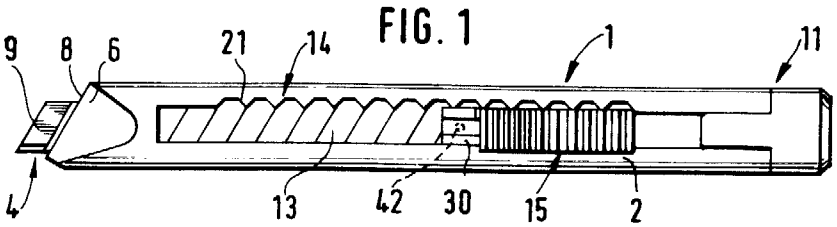
FIG. 1 is an elevational view of the blade holding handle according to the invention.
Figure 2:
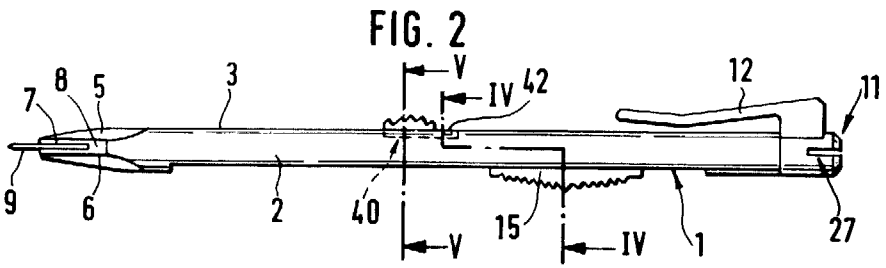
FIG. 2 is a plan view of the blade holding handle according to the invention.
Figure 3:
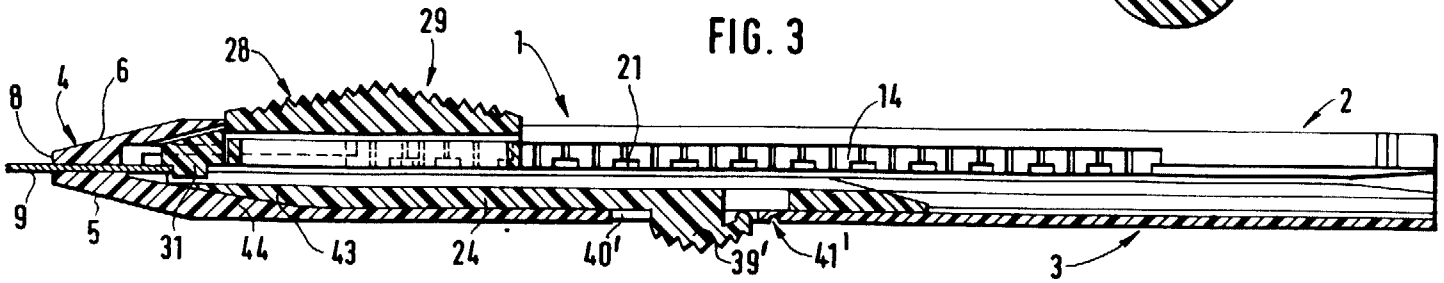
FIG. 3 is a longitudinal section of the blade holding handle according to the invention.

The blade holding handle according to the invention has a hollow rectilinear body 1 which forms a sleeve consisting of a unitary shell having a curved outer profile, as shown in FIG. 4, including a front face 2 and a rear face 3. It is preferably injection molded in a single piece from plastics material.

The body has a tapered front end 4 defined by two convergent walls 5 and 6 and is provided with a central slot 7 through an inclined front wall 8 from which the blade 9 projects.

The opposite or rear end of the hollow body 1 is blocked by a removable clip 11 similar to a pen clip which is attached to the body, the tab 12 of which overlies the rear face.

The front face 2 has a longitudinal slot 13 extending from its rear face 3 to the vicinity of its front face 2, the slot 13 being provided with a series of notches 14 along a portion of its upper edge.

This slot 13 is provided for the movement of a slider for advancing or retracting the blade.

The inner cavity of the body 1 comprises a plurality of rectilinear grooves in which the blade, the slider and a blade wedging mechanism 16 are disposed.

In a median position, the body is provided with two facing grooves - an upper groove 17 and a lower groove 18 having a rectangular profile and forming a guide in which the blade 9 is adapted to slide.

In the region of the groove 17, the inner cavity is extended transversely by a longitudinal flat surface 19 terminated by the notches 14. The inner cavity is extended transversely on the other side of the groove 17 by way of a second longitudinal flat surface 22 followed by a slightly offset curved inner face 23 against which bears the mating elongated portion 24 of the wedging mechanism 16.

Opposite the series of notches 14, the body provides an upstanding rib 25 which defined an auxiliary groove 26 for guiding the slider during longitudinal movement of the same.

The grooves 17 and 18 form a guide for a conventional segmented steel cutting blade 9 which is made from strip steel and one edge of which is sharp and forms the cutting edge. One of the side faces of the cutting blade 9 has successive slanted parallel notches which constitute break lines and are spaced apart to correspond to a slider advance of one notch 14.

The clip 11 consists of a piece designed to be inserted into the rear end of the body 1 and provides on one of its sides, a flexible tab 12 overlying the rear face of the handle. The end of the clip is provided with a slot 27 designed to receive a spent segment of the blade 9 to break off the same so that a sharp segment is presented for use.

Figure 6:
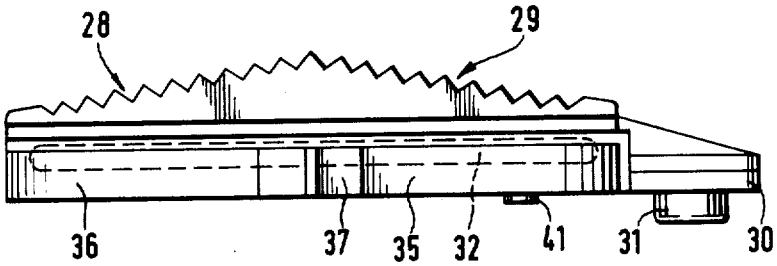
FIG. 6 is a plan view of the slider according to the invention.

The slider 15 comprises special features. This slider is made of a single piece of hard-wearing plastics material. Integrated in its structure are the finger piece, the catch, and the blade mounting means. As shown in FIG. 6, it has a generally parallelepipedal shape and its outer face forms a finger piece in the form of two identical opposed inclined planes 28 and 29 provided with grooves enabling the blade to be readily extended and retracted simply by the application of a finger on the slider. At its front end, it is provided with a blade mounting portion 30 having a central transverse projection 31 which passes through the hole provided at the end of the blade and causes the latter to be longitudinally moved.

Figure 7:
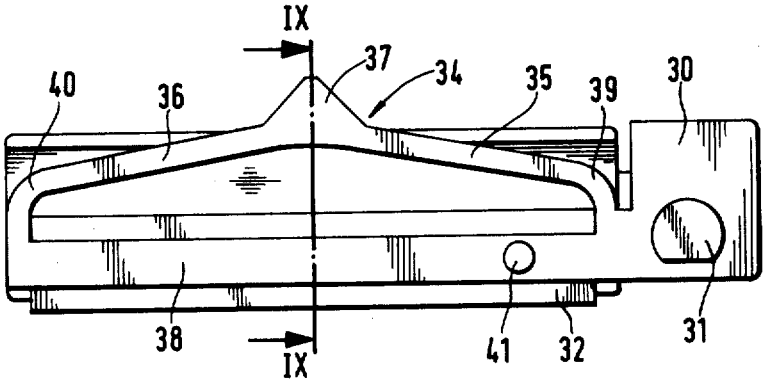
FIG. 7 is an elevational view of the slider.
Figure 8:
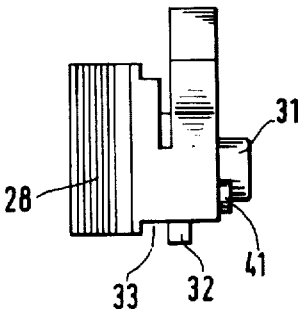
FIG. 8 is a side view of the slider.

As shown in FIG. 7, the lower face of this slider is flat and comprises in a median position thereof a longitudinal rib 32 having a substantially rectangular section so as to be slidably mounted in the auxiliary groove 26 of the handle body 1.

Figure 9:
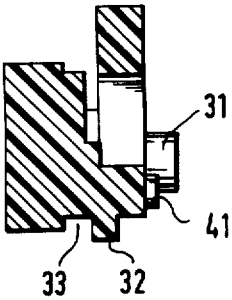
FIG. 9 is a transverse section of the slider along the line IX—IX of FIG. 7 of the invention.

As shown in FIG. 9, a longitudinal recess 33 permits the rib 32 to project into auxiliary groove 26, to guide the slider over the entire length of the slot 13.

On its inner face, the slider 15 is provided with an integral catch 34 molded from the same material as the slider. The catch has two convergent arms 35 and 36 having a common end which is provided with a detent 37 adapted to be received in the notches 14 provided on the upper edge of the slot 13. The other ends of the arms 36, 37 are each rigidly connected to an end of a reinforcing rib 38 by way of a right-angled connection attached to round portions 39, 40 so as to take advantage of the flexibility of the material, thereby ensuring that the blade is retained in a given position and the ready manipulation of the slider.

The reinforcing rib 38 has a projection 41 against which the slanting end of the blade abuts.

Another novel feature of the invention is its blade wedging member 16.

The elongated portion 24 of wedging member 16 has two longitudinal bearing surfaces engageable with the blade 9 and is mounted so as to be longitudinally movable relative to the blade and the curved face 23 inside the handle. At its end, member 16 is provided with a finger piece projecting through a rectangular cut-out 40 of the rear face 3 of the handle so that the wedging member 16 has limited longitudinal movement.

This wedging member 16, which is smaller than the slider 34, also has a manipulating face comprising two opposed sloping surfaces one of which is provided with an extension having a projection which engages a spherical recess 41' provided on the rear face 3 of the handle, thereby latching the wedging member 16 in the "blade release" position.

This elongated portion 24 has a bevelled end 43 which bears against an inclined face 44 provided at the end of the inner cavity of the handle enabling the blade to be wedged in any position by the application of lateral pressure on its inner face.

The invention has been described in detail but certain simple modifications of form, dimensions and disposition of the various elements and materials used can be made in the form of equivalents without departing from the scope of the invention.

I claim:

1. In a cutting blade holding handle having a segmented removable blade comprising a unitary generally rectangular hollow body formed of a molded plastics material and having a longitudinal slot extending through one side wall from one end thereof, a pair of facing longitudinal grooves within said hollow body terminating in an end slot through the other end of said body to slidably mount the blade to advance and retract the blade through said end slot, a series of notches formed along one edge of said longitudinal slot, and a unitary slider adapted to control the longitudinal movement of the blade, the improvement comprising a wedging member engageable with one side of the blade, said hollow body having an inclined interior wall adjacent said end slot, and said wedging member having a bevelled end engageable therewith to frictionally engage and apply a lateral pressure against the blade and means to slide said wedging member from an inactive position in which the wedging member does not apply lateral pressure to the blade to an active position wherein the wedging member is slid up the inclined interior wall adjacent said end slot and the bevelled end of said wedging member frictionally engages and applies a lateral pressure against the blade to lock the blade in position.

2. A device according to claim 1 wherein said wedging member has a finger piece extending through a cutout in the side wall of said handle opposite said longitudinal slot.

3. A device according to claim 2 wherein said finger piece is provided with a latch to releasably secure said wedging member in one of its longitudinal positions.

4. A device according to claim 1 including an auxiliary groove for mounting said slider formed in the edge of said longitudinal slot opposite the edge having said notches.

5. A device according to claim 1 in which said *slider has a* finger piece [is] provided with a pair of resilient integral arms joined at their free ends to mount a detent engageable with said notches for positioning said blade at selected longitudinal positions.

*6. In a cutting blade holding handle having a blade comprising a hollow body forming a cavity and having an end slot through one end thereof, means within said cavity for guiding the blade to advance and retract the blade through said end slot, the improvement comprising a wedging member engageable with one side of the blade, said cavity having an inclined interior wall adjacent said end slot and said wedging member having a bevelled end engageable therewith, and means to slide said wedging member from an inactive position in which the wedging member does not apply lateral pressure to the blade to an active position wherein the wedging member is slid up the inclined interior wall adjacent said end slot and the bevelled end of*

*said wedging member engages and applies a lateral pressure against the blade to hold the blade in position.*

*7. A device according to claim 6 wherein a cutout is provided in the side wall of said handle and said wedging member has a finger piece extending through said cutout.*

*8. A device according to claim 7 wherein said handle is provided with a recess and said finger piece is provided with a detent engageable therewith to releasably secure said edging member in one of said positions.*

* * * * *